US008496523B2

(12) United States Patent
Bytnar et al.

(10) Patent No.: US 8,496,523 B2
(45) Date of Patent: Jul. 30, 2013

(54) WAGER RESIDUALS

(75) Inventors: Michael R. Bytnar, Naperville, IL (US); Jeremy M. Hornik, Chicago, IL (US); Marija Kuzmanovic, Mount Prospect, IL (US); Craig J. Sylla, Round Lake, IL (US)

(73) Assignee: WMS Gaming, Inc., Waukegan, IL (US)

( * ) Notice: Subject to any disclaimer, the term of this patent is extended or adjusted under 35 U.S.C. 154(b) by 115 days.

(21) Appl. No.: 12/933,142

(22) PCT Filed: Mar. 20, 2009

(86) PCT No.: PCT/US2009/037750
§ 371 (c)(1),
(2), (4) Date: Sep. 17, 2010

(87) PCT Pub. No.: WO2009/117629
PCT Pub. Date: Sep. 24, 2009

(65) Prior Publication Data

US 2011/0021267 A1 Jan. 27, 2011

Related U.S. Application Data

(60) Provisional application No. 61/038,228, filed on Mar. 20, 2008.

(51) Int. Cl.
*A63F 9/24* (2006.01)
*A63F 13/00* (2006.01)
*G06F 17/00* (2006.01)
*G06F 19/00* (2006.01)

(52) U.S. Cl.
USPC .......... 463/25

(58) Field of Classification Search
USPC .......... 463/25
See application file for complete search history.

(56) References Cited

U.S. PATENT DOCUMENTS

| | | | | | |
|---|---|---|---|---|---|
| 5,820,459 | A | * | 10/1998 | Acres et al. | 463/25 |
| 2003/0220138 | A1 | * | 11/2003 | Walker et al. | 463/25 |
| 2007/0021198 | A1 | | 1/2007 | Muir et al. | |
| 2007/0207854 | A1 | | 9/2007 | Wolf et al. | |
| 2007/0293306 | A1 | | 12/2007 | Nee et al. | |
| 2007/0298873 | A1 | | 12/2007 | Nguyen et al. | |

FOREIGN PATENT DOCUMENTS

WO WO 2009117629 9/2009

OTHER PUBLICATIONS

"PCT Application No. PCT/US09/37750 International Preliminary Report on Patentability", Mar. 4, 2010 , 13 pages.
"PCT Application No. PCT/US09/37750 International Search Report", May 20, 2009 , 8 pages.

* cited by examiner

*Primary Examiner* — William M. Brewster
(74) *Attorney, Agent, or Firm* — DeLizio Gilliam, PLLC

(57) ABSTRACT

Techniques for handling wager residuals are described herein. Embodiments include a method that detects a residual from one or more wagers remaining in a first memory location for an electronic wagering game machine. The residual of the one or more wagers are transferred from the first memory location to a second memory location. Information about the residual is stored. The residual from the first memory location is cleared.

25 Claims, 7 Drawing Sheets

WAGER RESIDUALS

RELATED APPLICATIONS

This application claims the priority benefit of U.S. Provisional Application Ser. No. 61/038,228 filed Mar. 20, 2008.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2009, WMS Gaming, Inc.

FIELD

Embodiments of the inventive subject matter relate generally to wagering game systems.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines.

It is possible for portions of wagers to remain on a wagering game machine. The portion can be a fraction of a smallest currency denomination or a credit amount that is not wholly divisible by a wagering denomination of the wagering game machine. In certain jurisdictions, gaming regulations do not permit wagering game machines to be removed from play as long as a non-zero balance exists on the wagering game machine.

SUMMARY

In some embodiments, a method comprises detecting a residual from one or more wagers remaining in a first memory location for an electronic wagering game machine; transferring the residual of the one or more wagers from the first memory location to a second memory location; storing information about the residual; and clearing the residual from the first memory location.

In some embodiments, the first memory location is local to the electronic wagering game machine and the second memory location is remote from the electronic wagering game machine.

In some embodiments, the second memory location is local to the electronic wagering game machine.

In some embodiments, the second memory location comprises a memory location that withstands a memory clear command.

In some embodiments, the second memory location comprises a persistent store.

In some embodiments, the residual comprises one of a fraction of a smallest currency denomination and a denomination that is not evenly divisible by a wager denomination of the electronic wagering game machine.

In some embodiments, the information comprises at least one of an indication of the electronic wagering game machine, a time when said transferring occurs, an indication of an amount of the residual, and an indication of a the residual as a credit or currency.

In some embodiments, said detecting is in response to a request to remove the electronic wagering game from play.

In some embodiments, the method further comprises removing the electronic wagering game machine from play.

In some embodiments, a method comprises detecting a plurality of wager residuals on a plurality of electronic wagering game machines; transferring the plurality of wager residuals from the plurality of electronic wagering game machines to one or more wagering game servers; clearing the wager residuals from the plurality of electronic wagering game machines; and using the transferred wager residuals for one or more wagering games.

In some embodiments, said transferring comprises aggregating the plurality of residual wager amounts.

In some embodiments, said using comprises creating a jackpot with an aggregate of the plurality of wager residuals.

In some embodiments, said using comprises using each of the plurality of residual wager amounts as a lottery number.

In some embodiments, said using comprises comparing an aggregate of the plurality of residual wager amounts against a threshold value; and triggering a payout if the aggregate of the plurality of residual wager amounts meets or exceeds the threshold value.

In some embodiments, a method comprises detecting closing of a player account; determining that the player account has a wager residual; transferring the wager residual from the player account to an escrow account for wager residuals collected from closed player accounts; and storing data about said transferring.

In some embodiments, the method further comprises marking the player account as closed but available for reopening for a given period of time; and postponing said transferring until expiration of the given period of time.

In some embodiments, said data comprises an indication of an owner of the player account, time when said transferring occurs, and indication of an amount of the wager residual.

In some embodiments, said transferring comprises aggregating the wager residual with a plurality of other wager residuals from a plurality of other player accounts.

In some embodiments, the wager residual comprises one of an amount smaller than a smallest currency denomination and an amount smaller than a smallest wager denomination.

In some embodiments, one or more machine-readable media having stored therein a program product which, when executed on a set of one or more processors, causes the set of one or more processors to perform operations that comprise detecting a residual from one or more wagers remaining in a first memory location for an electronic wagering game machine; transferring the residual of the one or more wagers from the first memory location to a second memory location; storing information about the residual; and clearing the residual from the first memory location.

In some embodiments, the first memory location is local to the electronic wagering game machine and the second memory location is remote from the electronic wagering game machine.

In some embodiments, the second memory location is local to the electronic wagering game machine.

In some embodiments, an electronic wagering game machine comprises a set of one or more processors operable to execute instructions; a memory coupled with the set of one or more processors; and a machine-readable media having stored therein instructions executable by the set of one or more processors, which cause the set of one or more processors to perform operations that comprise, detecting a residual from one or more wagers remaining in a first accounting location; transferring the residual of the one or more wagers from the first accounting location to a second accounting location; storing information about the residual; and clearing the residual from the first memory location.

In some embodiments, the electronic wagering game machine further comprises a second memory separate from the memory, wherein the memory hosts the first accounting location and the second memory hosts the second accounting location.

In some embodiments, the memory is operable to host the first and the second accounting locations.

In some embodiments, the storing operation comprises storing data that indicates an amount of the residual, that identifies the electronic wagering game machine, and that indicates a time of the transferring operation.

In some embodiments, the operations further comprise generating a message that comprises the information and transmitting the message to a back-end.

In some embodiments, a wagering game server comprises a set of one or more processors operable to execute instructions; one or more network interfaces coupled with the set of one or more processors; and a machine-readable media having stored therein instructions executable by the set of one or more processors, which cause the set of one or more processors to perform operations that comprise, detecting a plurality of wager residuals on a plurality of electronic wagering game machines in communication with the wagering game server via the one or more network interfaces; transferring the plurality of wager residuals from the plurality of electronic wagering game machines to a location separate from the one or more electronic wagering game machines; clearing the wager residuals from the plurality of electronic wagering game machines; and using the transferred wager residuals for one or more wagering games.

In some embodiments, the separate location comprises one of the wagering game server, a different server, an electronic wagering game machine, and a network storage.

In some embodiments, the operations further comprising removing the plurality of electronic wagering game machines from play after said clearing operation.

BRIEF DESCRIPTION OF THE FIGURES

Embodiments are illustrated in the Figures of the accompanying drawings in which.

DESCRIPTION OF THE EMBODIMENTS

The description that follows includes example systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

On a wagering game machine, residuals of wagers ("wager residuals") can remain on the electronic wagering game machine. A wager residual may be smaller than a smallest denomination of a currency (e.g., $0.0005). A wager residual may be smaller than a smallest wager denomination for a given wagering game (e.g., a wagering game only accepts wagers in 100 credit increments and 50 credits remain). A number of scenarios can result in a wager residual. Examples scenarios include the following: an electronic wagering game machine accepting a first currency for a wager but dispensing in a different currency; an electronic wagering game machine reads tickets for wagers but dispenses a particular denomination and does not print tickets; computation of awards based on percentages; and an electronic wagering game machine accepts a first denomination of a currency but dispenses in a second denomination of the currency.

In some jurisdictions, an electronic wagering game machine cannot be removed from play or taken out of service, for maintenance for instance, if the electronic wagering game machine has a non-zero balance. The wager residuals can be collected over time and/or across multiple wagering game machines and removed from the electronic wagering game machines. An accounting mechanism moves the wager residuals to a different location, for example an escrow account, to achieve a non-zero balance. A wagering game network and/or electronic wagering game machine can use the aggregated wager residuals for wagering games.

Figure 1:
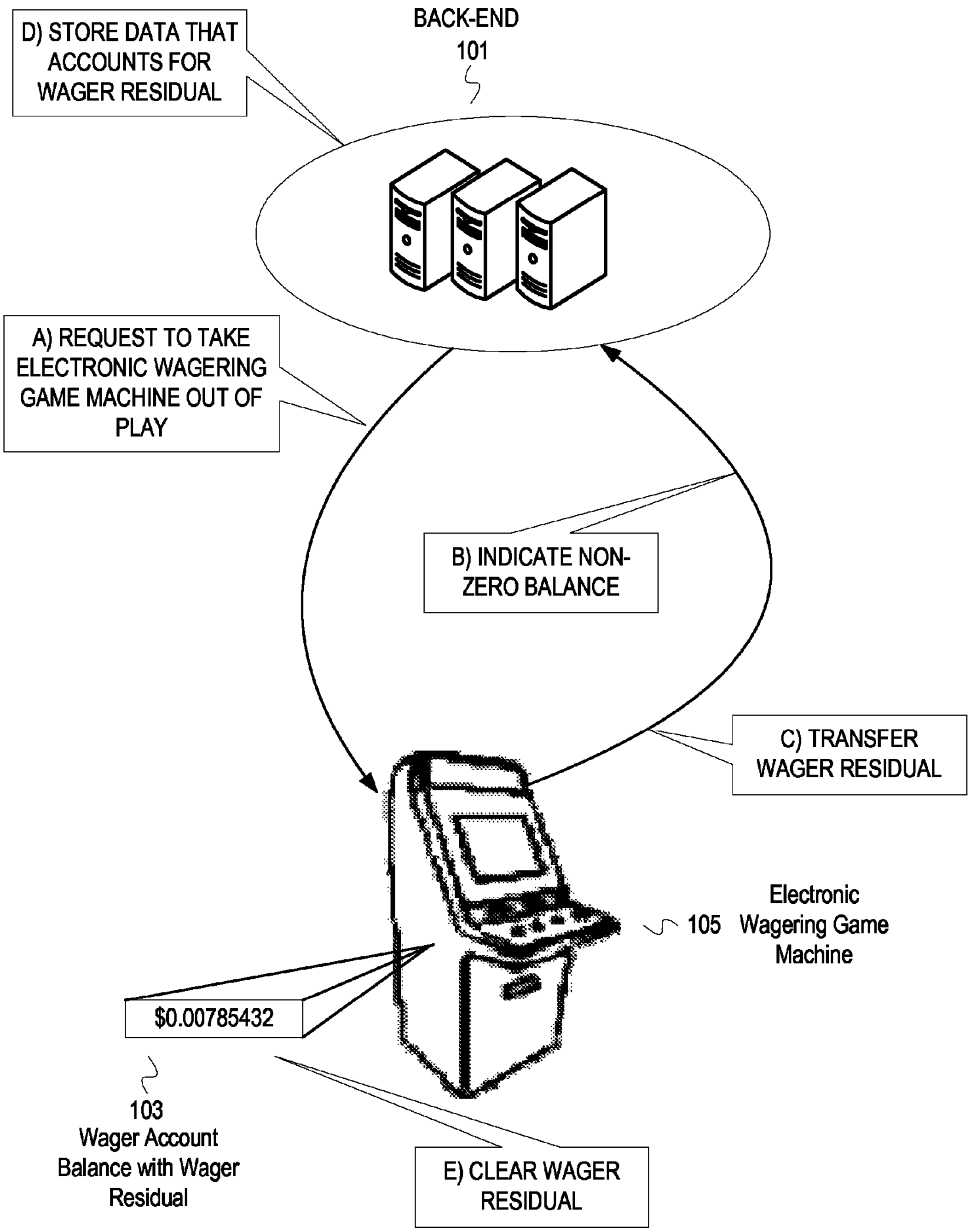
FIG. 1 depicts an example conceptual diagram of transferring a wager residual to a different location.

FIG. 1 depicts an example conceptual diagram of transferring a wager residual to a different location. An electronic wagering game machine 105 has a wager account 103 with a wager residual of $0.00785432. At a stage A, one or more wagering game servers in a back-end 101 submits a request to take the electronic wagering game machine 105 out of play. At a stage B, the electronic wagering game machine 105 indicates the existence of a non-zero balance. At a stage C, the electronic wagering game machine 105 transfers the wager residuals to the back-end 101. At a stage D, the back-end 101 stores data that accounts for the wager residual transferred from the electronic wagering game machine. Example data indicates the electronic wagering game machine 105, the amount of the wager residual, and time of the transfer. At a stage E, the wager residual is cleared from the electronic wagering game machine 105. After the wager residual is cleared from the electronic wagering game machine 105, the electronic wagering game machine 105 can be taken out of play (e.g., for a software update, hardware maintenance, etc.).

Although an order of operations is implied with the stages in FIG. 1, the stages are meant to aid in understanding embodiments and should not be used to limit embodiments. For instance, the operations of stages C, D, and E can take place in different order (e.g., stages D and E may be performed in parallel, stages C and E may be performed in parallel and before the operation(s) of stage E, etc.). In addition, the operations/communications depicted in FIG. 1 are examples. The back-end 101 may access the electronic wagering game machine 105 to determine the wager account balance on the electronic wagering game machine 105 instead of waiting for a message from the electronic wagering game machine 105. As another example, the electronic wagering game machine 105 can report a wager residual, and is not limited to responding to a request to remove the machine from play. The electronic wagering game machine 105 can report a wager residual to the back-end 101 after a lack of game play for more than a given period of time.

Figure 2:
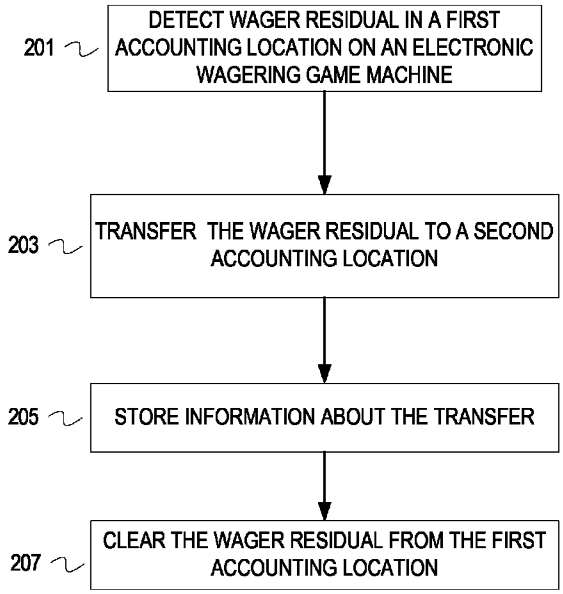
FIG. 2 depicts a flowchart of example operations for transferring a wager residual.

FIG. 2 depicts a flowchart of example operations for transferring a wager residual. At block 201, a wager residual is detected in a first accounting location on an electronic wagering game machine. For instance, a module on the electronic wagering game accesses the accounting location to determine whether the accounting location indicates a non-zero balance in response to a service request. In another embodiment, the electronic wagering game reports to a back-end if the electronic wagering game machine has not been played for a given period of time and if a wager residual exists on the electronic wagering game machine.

At block 203, the wager residual is transferred to a second accounting location. The second accounting location may be local or remote with respect to the electronic wagering game machine. In an embodiment, the second accounting location withstands a memory clear operation. For instance, the first and the second accounting locations may be in different memory or storage on the electronic wagering game machine. A memory clear operation, for example to allow the electronic wagering game machine to be taken out of play, can be limited to targeting a first memory and not a second memory. In another example, the different memory locations can be different variables, different address spaces, etc. In another embodiment, the second accounting location can be in remote memory or remote storage. For example, a back-end server or back-end storage can maintain an escrow account for wager residuals from electronic wagering game machines. The back-end can maintain a wager residual accounting location for each electronic wagering game machine, different accounting locations for wager residuals from different games and/or types of games, a single accounting location for wager residuals from electronic wagering game machines of a particular manufacturer, etc.

At block 205, information about the transfer is stored. For example, executing code stores data, either remotely or locally, that indicates the electronic wagering game machine, date of the transfer, and amount of the wager residual.

At block 207, the wager residual is cleared from the first accounting location.

The example operations depicted in FIG. 2 assume an accounting mechanism that accumulates wager residuals over time. It is not necessary, however, to accumulate wager residuals. Wager residuals can be added to subsequent game play. For instance, multiple thresholds can be defined for moving wager residuals. If game play occurs after a first time threshold but before a second time threshold, then the wager residual(s) in the separate accounting location is made available for wagering. If game play does not occur before expiration of the second time threshold, then the wager residual(s) is marked or transferred off of the electronic wagering game machine.

Figure 3:
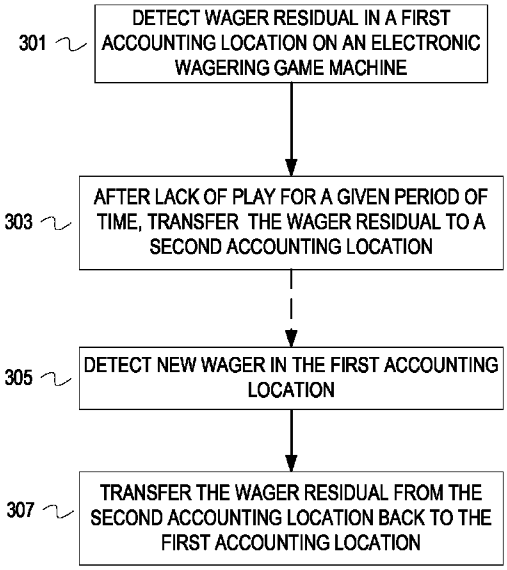
FIG. 3 depicts a flowchart of example operations for funding wagers with wager residuals.

FIG. 3 depicts a flowchart of example operations for funding wagers with wager residuals. At block 301, a wager residual is detected in a first accounting location on an electronic wagering game machine. At block 303, the wager residual is transferred to a second accounting location after lack of game play for a given period of time. After a brief or long period of time, control flows to block 305. At block 305, a new wager is detected in the first accounting location. At block 307, the wager residual from the second accounting location is transferred back to the first accounting location. For example, the wager residual may be 13 credits on an electronic wagering game machine with a base wager denomination of 20 credits. If the subsequent player provides 39 credits, then the player will have 50 credits available for wagers—a wager residual of 2 credits ignoring winnings.

Wager residuals can be used in other ways. Wager residuals can be used to fund games and/or as a playable elements in a game. For instance, wager residuals accumulated over time and aggregated across wagering game machines can fund a jackpot. The funding may be automatic and/or voluntary (i.e., a player may choose to fund a jackpot with credit that could be wagered). Moreover, a game can use the amount of the wager residual as a factor in triggering a win. Examples for using a wager residual as a factor in a wagering game include: providing a special coin, ticket, etc., to a player that represents participation in a wagering game; using the amount of the wager residual as a lottery number; awarding a win to the player whose wager residual pushed a jackpot beyond a given threshold; etc.

Figure 4:
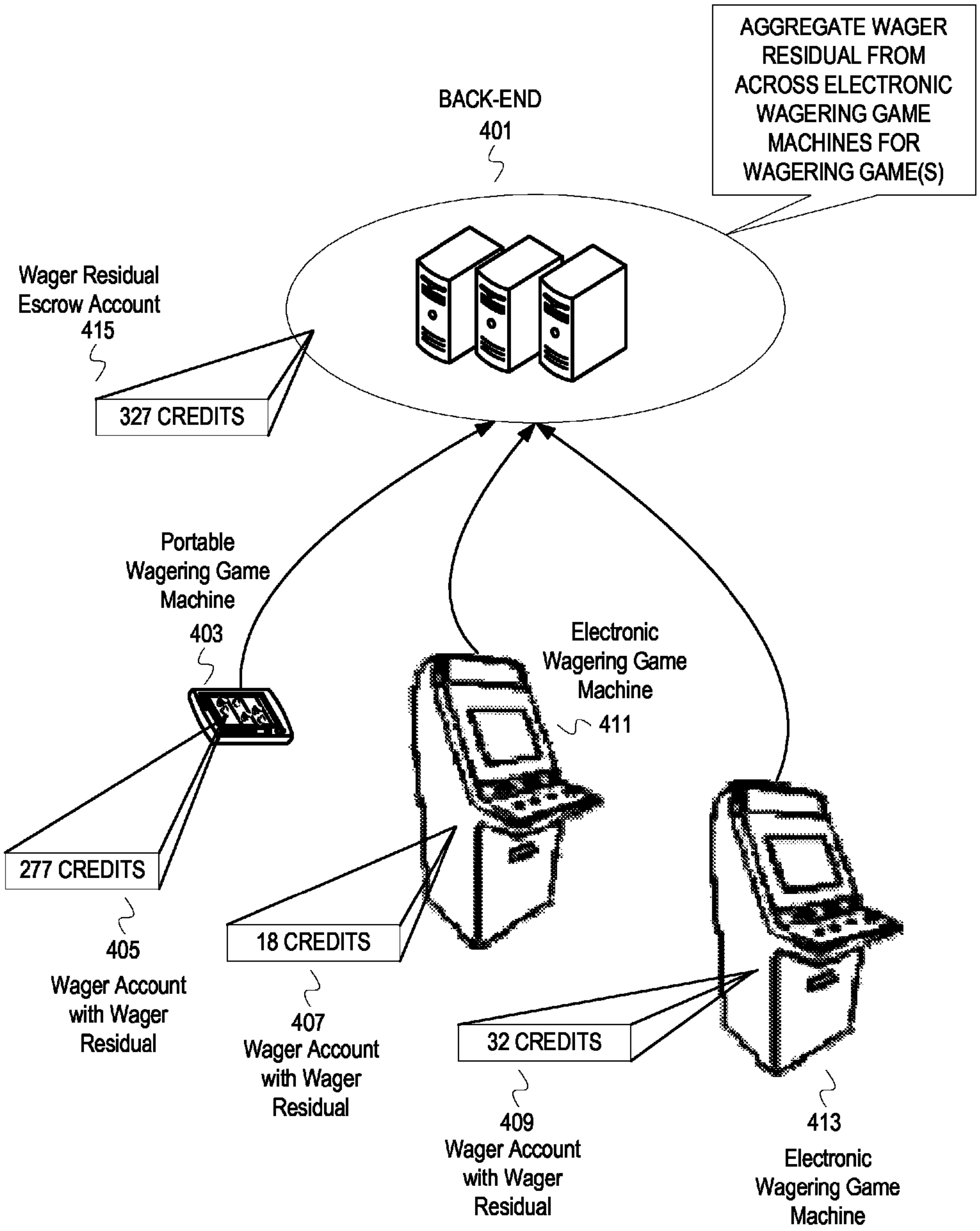
FIG. 4 depicts an example conceptual diagram of aggregating wager residuals across a network of wagering game machines.

FIG. 4 depicts an example conceptual diagram of aggregating wager residuals across a network of wagering game machines. An electronic wagering game machine 411 has a wager account 407 with a wager residual of 18 credits. An electronic wagering game machine 413 has a wager account 409 with a wager residual of 32 credits. A portable wagering game machine 403 has a wager account 405 with a wager residual of 277 credits. The electronic wagering game machines 403, 411, and 413 are networked with a back-end 401. The back-end 401 aggregates the wager residuals from across the electronic wagering game machines 403, 411, and 413 into a wager residual escrow account 415. FIG. 4 depicts the wager residual escrow account as having 327 credits, which is the sum of the aggregated wager residuals assuming the wager residual escrow account 415 was previously empty. The wager residuals are cleared from the electronic wagering game machines 403, 411, and 413 and used for one or more wagering games.

Although wagering games can be funded automatically with wager residuals, players can be provided the opportunity to opt-out of an automatic transfer of wager residuals into a wagering game fund (e.g., jackpot), or be given an opportunity to voluntarily mix wager residuals and full wagers for a wagering game. For example, a player may be playing three wagering games on an electronic wagering game machine. For this example, the wagering games have base wager denominations of a penny, a dollar, and twenty dollars. The player can select options that siphon off winnings from the penny wagering game into an account that accumulates until sufficient for wagering in the dollar game. The player can also select an option that causes winnings from the dollar game to be used as wagers in a pool of progressive jackpots primarily funded by wager residuals aggregated across a network of electronic wagering game machines. Wager residuals in the twenty dollar wagering game are automatically transferred to a wager residual escrow account for one or more wager residual jackpots. This example of wager residuals in multiple wagering games should not be used to limit embodiments because a number of permutations are possible (e.g., different funding settings based on different paylines within a single game).

Despite the examples referring to transferring wager residuals from electronic wagering game machines, embodiments are not so limited. Residuals can be collected from player accounts. Players may close accounts with non-zero balances of credits or money. These wager residuals can be transferred from player accounts into one or more wager residual escrow accounts, directly into jackpots, converted into lottery numbers for the players, etc.

Figure 5:
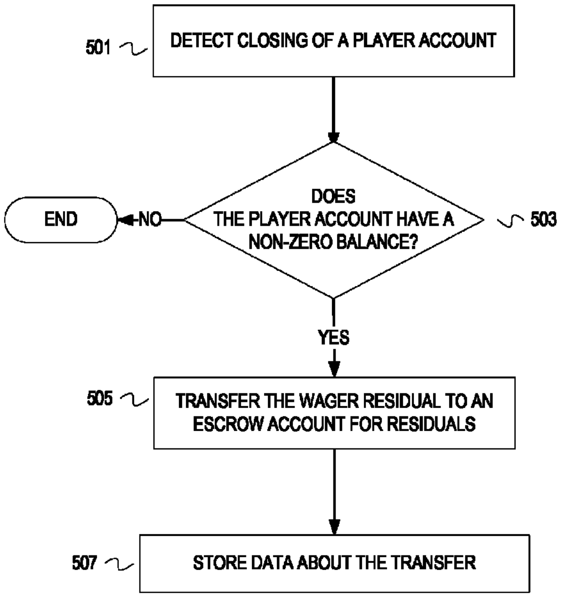
FIG. 5 depicts a flowchart of example operations for collecting wager residuals from closed player accounts.

FIG. 5 depicts a flowchart of example operations for collecting wager residuals from closed player accounts. At block 501, closing of a player account is detected. In an embodiment, a player is prompted to confirm closing of his/her account despite having a non-zero balance. In another embodiment, a gaming establishment marks and preserves closed accounts until wager residuals are collected and accounted after a given period of time expires.

At block 503, it is determined if the player account has a non-zero balance. If the player account has a non-zero balance, then control flows to block 505. If the player account has a zero balance, then the flow ends.

At block 505, the wager residual remaining in the player account is transferred to an escrow account for wager residuals. In an embodiment, a back-end maintains escrow accounts for wager residuals from player accounts. The escrow accounts for wagers residuals from player accounts may be maintained temporarily, for example a given period of time in case the same player re-opens a player account. If the same player re-opens or newly opens a player account, the wager residual can be transferred to that player account.

At block 507, data about the transfer is stored. For example, accounting data is recorded to comply with regulations. Examples of data about the transfer include an identifier for player account (e.g., player name, player identifier, player account number, etc.), time of transfer, amount of the transfer, destination of the transfer, etc.

It should be understood that the depicted flowchart are examples meant to aid in understanding embodiments and should not be used to limit embodiments or limit scope of the claims. Embodiments may perform additional operations, fewer operations, operations in a different order, operations in parallel, and some operations differently. Referring to FIG. 2 as an example, information can be stored about the wager residual to be transferred before the actual transfer operation(s) is performed. In addition, the operations can be performed, in some embodiments, by executing instructions residing on machine-readable media (e.g., software), while in other embodiments, the operations can be performed by hardware and/or other logic (e.g., firmware).

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Operating Environment

This section describes an example operating environment and presents structural aspects of some embodiments. This section includes discussion about wagering game machine architectures, and wagering game networks.

Wagering Game Machine Architectures

Figure 6:
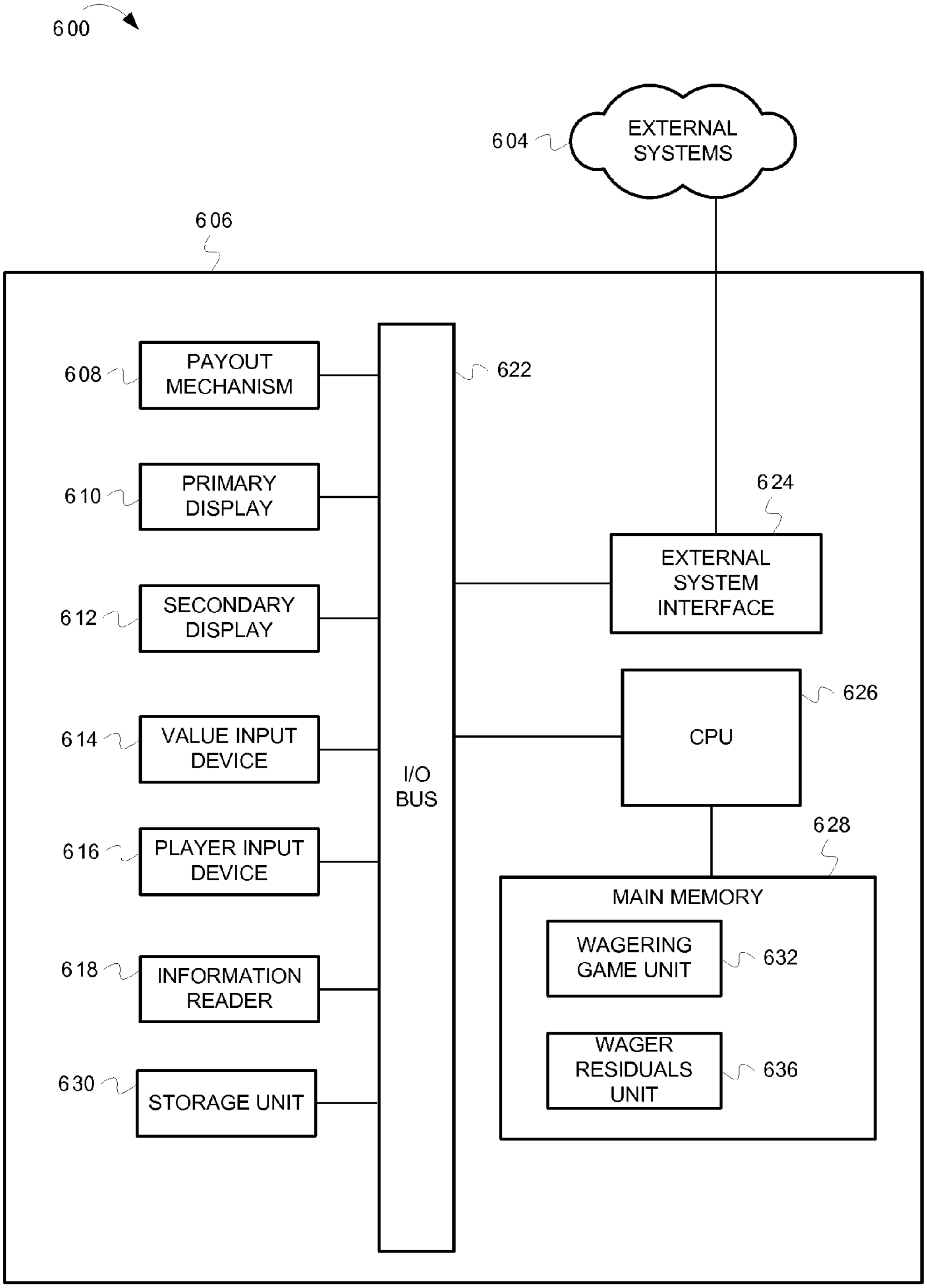
FIG. 6 is a block diagram illustrating a wagering game machine architecture, according to example embodiments of the invention.

FIG. 6 is a block diagram illustrating a wagering game machine architecture, according to example embodiments of the invention. As shown in FIG. 6, the wagering game machine architecture 600 includes a wagering game machine 606, which includes a central processing unit (CPU) 626 connected to main memory 628. The CPU 626 can include any suitable processor, such as an Intel® Pentium processor, Intel® Core 2 Duo processor, AMD Opteron™ processor, or UltraSPARC processor. The main memory 628 includes a wagering game unit 632. In one embodiment, the wagering game unit 632 can present wagering games, such as video poker, video black jack, video slots, video lottery, etc., in whole or part. The main memory 632 also includes a wager residuals unit 636 that embodies some of the functionality described above. For instance, the wager residuals unit 636 detects a wager residual and transfers the wager residual from a wagering account to separate local account (e.g., a variable that is not subject to memory clears, a location in persistent memory, a location in storage, etc.). As another example, the wager residuals unit 636 embodies functionality for detecting a wager residual and transferring the wager residual to a remote location.

The CPU 626 is also connected to an input/output (I/O) bus 622, which can include any suitable bus technologies, such as an AGTL+frontside bus and a PCI backside bus. The I/O bus 622 is connected to a payout mechanism 608, primary display 610, secondary display 612, value input device 614, player input device 616, information reader 618, and storage unit 630. The player input device 616 can include the value input device 614 to the extent the player input device 616 is used to place wagers. The I/O bus 622 is also connected to an external system interface 624, which is connected to external systems 604 (e.g., wagering game networks).

In one embodiment, the wagering game machine 606 can include additional peripheral devices and/or more than one of each component shown in FIG. 6. For example, in one embodiment, the wagering game machine 606 can include multiple external system interfaces 624 and/or multiple CPUs 626. In one embodiment, any of the components can be integrated or subdivided.

Any component of the architecture 600 can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

While FIG. 6 describes an example wagering game machine architecture, this section continues with a discussion wagering game networks.

Wagering Game Networks

Figure 7:
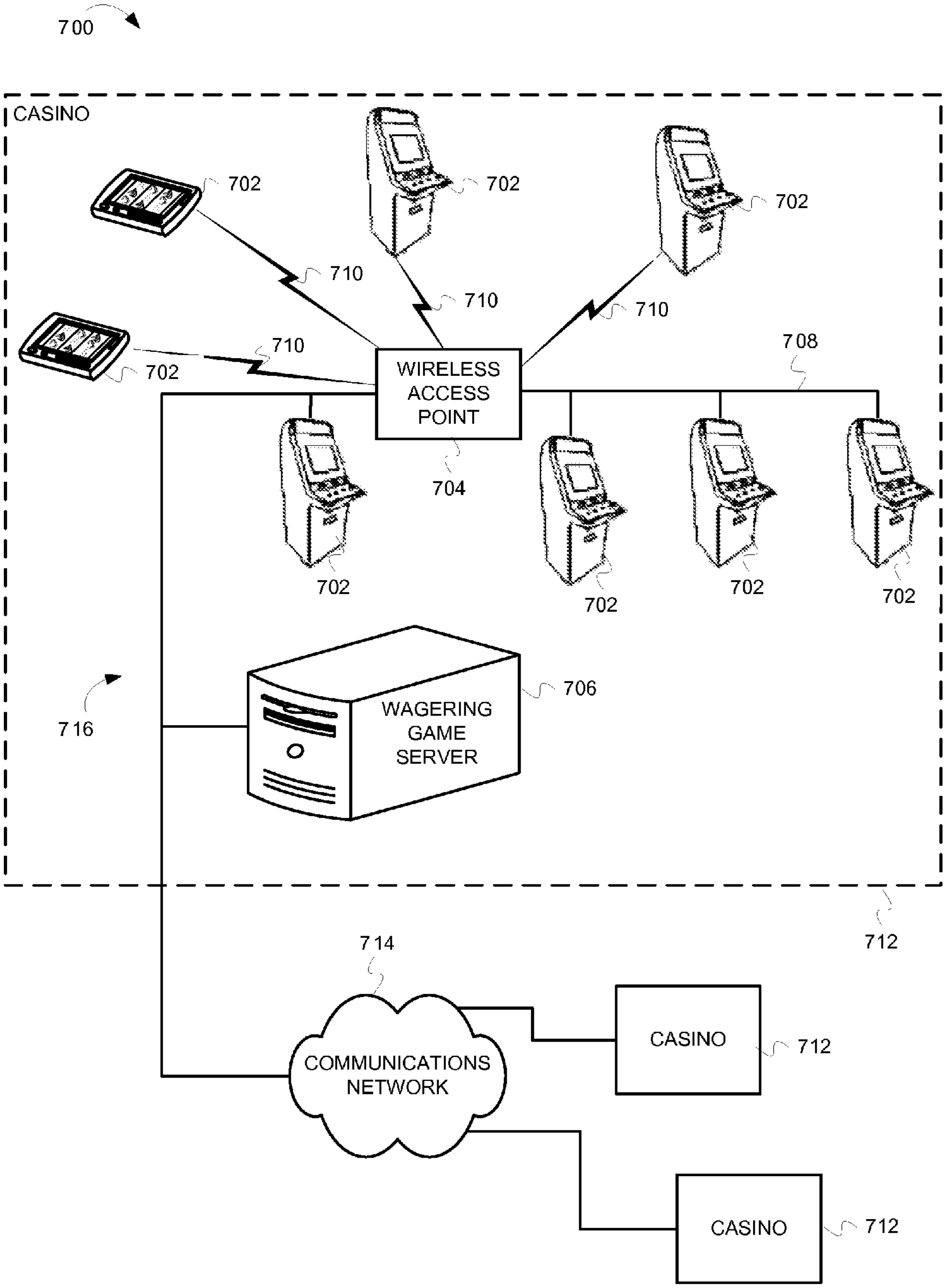
FIG. 7 is a block diagram illustrating a wagering game network 700, according to example embodiments of the invention.

FIG. 7 is a block diagram illustrating a wagering game network 700, according to example embodiments of the invention. As shown in FIG. 7, the wagering game network 700 includes a plurality of casinos 712 connected to a communications network 714.

Each casino 712 includes a local area network 716, which includes an access point 704, a wagering game server 706, and wagering game machines 702. The access point 704 provides wireless communication links 710 and wired communication links 708. The wired and wireless communication links can employ any suitable connection technology, such as Bluetooth, 802.11, Ethernet, public switched telephone networks, SONET, etc. In some embodiments, the wagering game server 706 can serve wagering games and distribute content to devices located in other casinos 712 or at other locations on the communications network 714.

The wagering game machines 702 described herein can take any suitable form, such as floor standing models, handheld mobile units, bartop models, workstation-type console models, etc. Further, the wagering game machines 702 can be primarily dedicated for use in conducting wagering games, or can include non-dedicated devices, such as mobile phones, personal digital assistants, personal computers, etc. In one embodiment, the wagering game network 700 can include other network devices, such as accounting servers, wide area progressive servers, player tracking servers, and/or other devices suitable for use in connection with embodiments of the invention.

In some embodiments, wagering game machines 702 and wagering game servers 706 work together such that a wagering game machine 702 can be operated as a thin, thick, or intermediate client. For example, one or more elements of game play may be controlled by the wagering game machine 702 (client) or the wagering game server 706 (server). Game play elements can include executable game code, lookup tables, configuration files, game outcome, audio or visual representations of the game, game assets or the like. In a thin-client example, the wagering game server 706 can perform functions such as determining game outcome or managing assets, while the wagering game machine 702 can present a graphical representation of such outcome or asset modification to the user (e.g., player). In a thick-client example, the wagering game machines 702 can determine game outcomes and communicate the outcomes to the wagering game server 706 for recording or managing a player's account. The wagering game server 706 embodies functionality to implement collecting and/or aggregating wager residuals from across the wagering game machines 702.

In some embodiments, either the wagering game machines 702 (client) or the wagering game server 706 can provide functionality that is not directly related to game play. For example, account transactions and account rules may be managed centrally (e.g., by the wagering game server 706) or locally (e.g., by the wagering game machine 702). Other functionality not directly related to game play may include power management, presentation of advertising, software or firmware updates, system quality or security checks, etc.

Any of the wagering game network components (e.g., the wagering game machines 702) can include hardware and machine-readable media including instructions for performing the operations described herein.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method comprising:

detecting a first wager residual from a first plurality of wagers by multiple players remaining in a first memory location for a first electronic wagering game machine;

transferring the first wager residual from the first memory location to a remote memory location that is distinct from a player account;

accounting for the first wager residual;

clearing the first wager residual from the first memory location;

detecting a second wager residual from a second plurality of wagers by multiple players remaining in a second memory location for a second electronic wagering game machine;

accounting for the second wager residual;

aggregating the second wager residual with the first wager residual in the remote memory location; and clearing the second wager residual from the second memory location.

2. The method of claim 1, wherein the first memory location is local to the first electronic wagering game machine and the second memory location is local to the second electronic wagering game machine.

3. The method of claim 1, wherein said accounting for the first wager residual comprises storing data that indicates the first wager residual, the first electronic wagering game machine, and a time of said transferring the first wager residual.

4. The method of claim 3, wherein said accounting for the first wager residual further comprises storing additional data that indicates at least one of a player account and a wagering game.

5. The method of claim 1, wherein the remote memory location is associated with one of an escrow account for wager residuals and a jackpot.

6. The method of claim 1, wherein the first wager residual comprises one of a fraction of a smallest currency denomination and a denomination that is not evenly divisible by a wager denomination of the electronic wagering game machine.

7. The method of claim 1, wherein said detecting the first wager residual from one or more wagers remaining in the first memory location for the first electronic wagering game machine is in response to a request to remove the first electronic wagering game from play.

8. The method of claim 1 further comprising removing the first electronic wagering game machine from play after said clearing the first wagering residual from the first memory location.

9. A method comprising:

detecting a plurality of wager residuals on a plurality of electronic wagering game machines, wherein the wager residuals are from wagers of various players;

aggregating the plurality of wager residuals into an account that is distinct from a player account;

clearing the plurality of wager residuals from the plurality of electronic wagering game machines; and using the plurality of wager residuals aggregated into the account for a wagering game.

10. The method of claim 9, wherein said using the plurality of wager residuals aggregated into the account for the wagering game comprises funding a jackpot.

11. The method of claim 10, wherein said using the plurality of wager residuals aggregated into the account for the wagering game comprises:

comparing an aggregate of the plurality of residual wager amounts against a threshold value; and triggering a payout of the wagering game if the aggregate of the plurality of residual wager amounts meets or exceeds the threshold value.

12. A method comprising:

detecting closing of a player account;

determining that the player account has a wager residual;

transferring the wager residual from the player account to an escrow account for wager residuals collected from closed player accounts; and storing data that accounts for the wager residual.

13. The method of claim 12 further comprising:

marking the player account as closed but available for reopening for a given period of time; and postponing said transferring until expiration of the given period of time.

14. The method of claim 12, wherein said data comprises an indication of an owner of the player account, time when said transferring occurs, and indication of an amount of the wager residual.

15. The method of claim 12, wherein said transferring comprises aggregating the wager residual with a plurality of other wager residuals from a plurality of other player accounts.

16. The method of claim 12, wherein the wager residual comprises one of an amount smaller than a smallest currency denomination and an amount smaller than a smallest wager denomination.

17. One or more non-transitory machine-readable media having stored therein a program product which, when executed on a set of one or more processors, causes the set of one or more processors to perform operations that comprise:

detecting a first wager residual from a first plurality of wagers by multiple players remaining in a first memory location for a first electronic wagering game machine;

transferring the first wager residual of the one or more wagers from the first memory location to a remote memory location that is distinct from a player account;

accounting for the first wager residual;

clearing the first wager residual from the first memory location;

detecting a second wager residual from a second plurality wagers by multiple players remaining in a second memory location for a second electronic wagering game machine;

accounting for the second wager residual;

aggregating the second wager residual with the first wager residual in the remote memory location; and clearing the second wager residual from the second memory location.

18. The machine-readable media of claim 17, wherein the first memory location is local to the first electronic wagering game machine and the second memory location is local to the second electronic wagering game machine.

19. The machine-readable media of claim 17, wherein said operation of accounting for the first wager residual comprises storing data that indicates the first wager residual, the first electronic wagering game machine, and a time of said transferring the first wager residual.

20. A wagering game server comprising:

a set of one or more processors operable to execute instructions;

one or more network interfaces coupled with the set of one or more processors; and a machine-readable media having stored therein instructions executable by the set of one or more processors, which cause the set of one or more processors to perform operations that comprise, detecting a plurality of wager residuals on a plurality of electronic wagering game machines in communication with the wagering game server via the one or more network interfaces, wherein the plurality of wager residuals are from wagers of various players;

aggregating the plurality of wager residuals into an account that is distinct from a player account;

clearing the plurality of wager residuals from the plurality of electronic wagering game machines; and using the plurality of wager residuals aggregated into the account for a wagering game.

21. The wagering game server of claim 20, wherein said operation of using the plurality of wager residuals aggregated into the account for the wagering game comprises funding a jackpot.

22. The wagering game server of claim 20, wherein the operations further comprise removing the plurality of electronic wagering game machines from play after said clearing operation.

23. The method of claim 12 further comprising generating a lottery number from the wager residual.

24. An apparatus comprising:

a processor;

a memory that hosts an escrow account of collected wager residuals, wherein a wager residual comprises one of a fraction of a smallest currency denomination and a denomination that is not evenly divisible by a wager denomination for a wagering game; and means for aggregating wager residuals from a plurality of wagering game machines into the escrow account that is distinct from a player account and clearing the wagering residuals from the plurality of wagering game machines, wherein the wager residuals are from wagers by various players.

25. The apparatus of claim 24 further comprising means for removing the plurality of wagering game machines from play after the wager residuals are cleared.

* * * * *